(No Model.)
S. KALTONIK.
DRIVE GEAR MECHANISM FOR BICYCLES, &c.
No. 528,437. Patented Oct. 30, 1894.
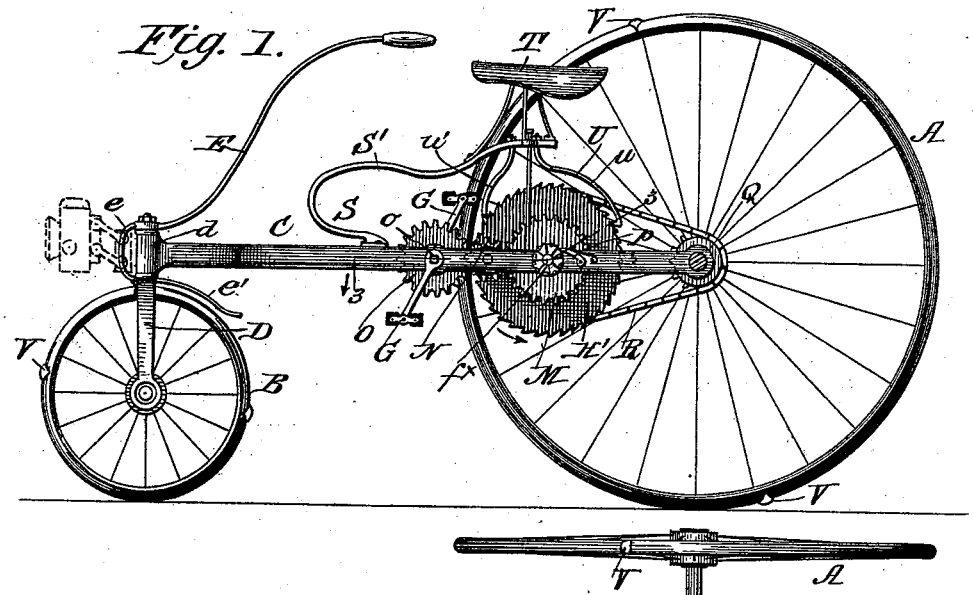
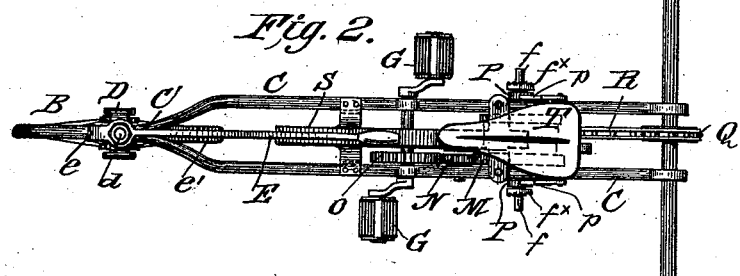
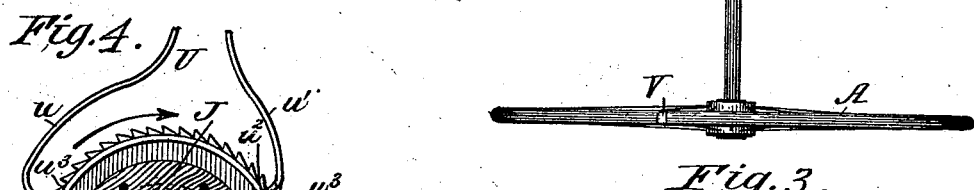
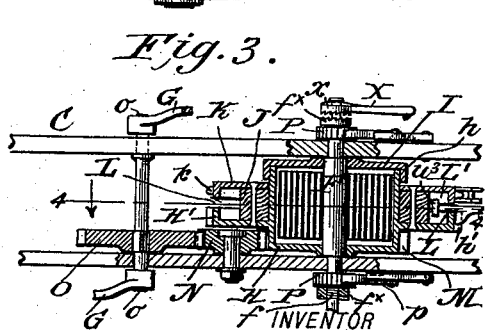
WITNESSES:
Fred G. Dieterich
M. D. Blondel
INVENTOR
Stephen Kaltonik
BY Munn & Co
ATTORNEYS.

UNITED STATES PATENT OFFICE.

STEPHEN KALTONIK, OF PUNXSUTAWNEY, PENNSYLVANIA.

DRIVE-GEAR MECHANISM FOR BICYCLES, &c.

SPECIFICATION forming part of Letters Patent No. 528,437, dated October 30, 1894.

Application filed February 19, 1894. Serial No. 500,689. (No model.)

*To all whom it may concern:*

Be it known that I, STEPHEN KALTONIK, residing at Punxsutawney, in the county of Jefferson and State of Pennsylvania, have invented a new and useful Drive-Gear Mechanism for Bicycles, Tricycles, &c., of which the following is a specification.

My invention relates more particularly to improvements in drive mechanism for bicycles, tricycles, &c., and it has for its object to provide a driving gear, including spring actuated means, which will serve to assist the rider in propelling the machine, and allow him to rest his feet at intervals while passing over level grades.

It has also for its object to provide a machine in which the vibrating weight pressure of the rider on the seat spring bar will assist in propelling such machine.

With other minor objects in view, which hereinafter will be referred to, the invention consists in such novel features of construction and peculiar combination of parts, all of which will be first described in detail and then be particularly pointed out in the claims, reference being had to the accompanying drawings, in which—

Figure 1 is a side elevation of a bicycle constructed in accordance with my invention. Fig. 2 is a plan view thereof. Fig. 3 is a horizontal section taken on the line 3—3 Fig. 1, and Fig. 4 is a longitudinal section taken on the line 4—4, Fig. 3.

In the accompanying drawings I have shown my improvements as applied to a tricycle, it being understood that they may be connected to a bicycle, by extending the supporting frame and arranging the spring actuated devices in advance of the rear wheel.

Referring now to the drawings by letter, A indicates the rear supporting or driving wheels and B, the front or steering wheel, and C the main supporting frame. This frame C it will be noticed by reference to Fig. 2 consists of the parallel side members joined at their front ends as at C', to form a socket in which is held the shank $d$ of the front fork D in which the steering wheel B is journaled as shown, the upper end of the shank $d$ having secured thereto the steering lever E which extends rearwardly in convenient reach of the seat, the front end of such lever being extended to form a lamp rest portion $e$, and a guard $e'$.

Between the side arms of the frame near the rear ends, is journaled transversely, an arbor or shaft F having its ends projected and squared as at $f\, f$, which have ratchet members $f^\times f^\times$ as shown.

Loosely journaled on the arbor F is a drum or spring barrel H, in which is held a strong clock spring, one end of which is secured to the barrel and at the other to the arbor F as most clearly shown in Fig. 4. By reference to this figure it will be noticed the spring is so secured that when the arbor is turned in the direction indicated by the arrow (by the ratchet levers as will hereinafter be described) such spring will be wound up, and when wound it will expand or unwind and carry the drum in a similar direction.

Referring now to Fig. 2 it will be noticed the drum H is formed with one side open, as at $h$, which is held closed by a cap piece I, and at its closed end it has an integral annular rim forming a ratchet wheel H' formed at its outer edge with a toothed periphery $h'$. Surrounding the drum or barrel H is a wooden ring or hub portion J, to which, as also the rim H' is bolted a second ring formed at its periphery with sprocket teeth $k$, such ring forming the main sprocket or drive wheel K.

It will be noticed that the ratchet and sprocket wheels H' and K are held spaced apart to form an annular slot L and an annular receiving chamber L' for a purpose presently described.

Fixedly connected to the drum at one side but loosely mounted on the arbor, is a gear wheel M, which meshes with a smaller gear N, journaled on the main frame, which in turn gears with a toothed wheel O, also journaled in the main frame, and having its shaft ends projected and squared as at $o$ to form receiving members for the pedal cranks G G.

At one or both ends the main arbor shaft has ratchets P P, with which engage hold back pawls $p\, p$. Q indicates the sprocket on the rear drive wheel, which is geared with the drive wheel K by the chain belt R as shown.

S indicates the seat spring bar which is secured at its lower end to the main frame, extends forward, then bends back upon itself as at S' and has its free end projected over the ratchet wheel H' and has at such end the seat T. Pivotally secured to the free end of said spring bar S, is a double pawl U, the ends $u$ and $u'$ of which extend to the front and rear of the ratchet wheel H' and have their ends adapted to alternately engage the teeth and impart thereto a pull and pushing action, the rear one $u$, operating on the upward spring throw of the bar S, to pull against the wheel H' and in the direction of its rotation, while the front one $u'$ will push against such wheel in the direction of its rotation, when the spring bar is on its down thrust. It should be stated however that such pawls $u\ u'$, are adapted as they alternately engage the wheel H', that while the one engages such wheel the other is held free, and to prevent such pawls from getting out of their proper range of movement, they are provided with extensions $u^2$ projected through the annular slot L, which have at their ends stops $u^3$, which are movable in the chamber L', and which engage the inner edges of the adjacent flanges of the wheels H' and K and limit the outward swing of said members $u\ u'$.

V indicates detachable clamp like spur or traction ribs which are adapted to be clamped to the tires of the wheels, to form an increased traction means for such wheels when it is desired to run at a great speed.

The manner in which a tricycle or similar machine with my improvements applied is operated is as follows: The spring is first wound up by means of a lever X, having a ratchet hub $x$ which is adapted to fit on the projections $f$ and engage the ratchets $f'$. The rider then starts the machine by operating the pedals in the ordinary manner, which starts the spring on its expansion or unwinding movement, which carries with it the wheel H and in consequence rotates the rear drive wheels. In case the machine is traveling on level ground the spring power will be sufficient to drive it over some distance, the speed of which can be augmented by operating the cranks. The spring movement of the wheel H' will also be increased by the sudden alternate jerks imparted thereto, by the vibrations of the seat bar and the pawls $u\ u'$. When climbing a hill, the operator works the cranks in the usual manner, which operation in connection with the spring action and the pull and push movement of the pawls $u\ u'$, reducing the foot power required to a minimum. It is obvious that as the wheel H and the connecting gears are held from reverse movement the machine in case it should stop at any point on an incline would be held from traveling backward.

When the machine is to be used by a very heavy person, the seat bar may be braced by supplemental spring braces if desired.

Having thus described my invention, what I claim, and desire to secure by Letters Patent, is—

1. As an improvement in drive gear mechanism for bicycles and the like, the combination with the main frame, and supporting wheels, a transverse shaft or arbor loosely journaled in the frame, a spring barrel journaled loosely on such shaft, a spring held therein and secured to the barrel and shaft, to turn said barrel forward as it expands a toothed wheel and a sprocket wheel secured on the barrel, held apart to form an annular slot, a seat spring bar secured to the frame, having one end free to vibrate, a double pawl pivoted thereto having its pawls held to engage the toothed disk at the front and rear, and having stop portions projected into the aforesaid annular slot all arranged substantially as shown and described.

2. As an improvement in drive gear devices for bicycles and the like the combination with the main frame and drive wheels, of the arbor or shaft F journaled transversely therein, having the usual hold back or detent devices, the barrel H loosely journaled on the shaft having an annular slot L the spring secured to such barrel H and shaft F said barrel having a sprocket portion and a tooth disk, and a gear member M, the crank shaft $o$ the gear connections N, O, the spring seat bar S, the seat T secured to the free end thereof, the double pawls $u\ u'$ having portions extended through the slot L formed with stops $u^3\ u^3$ all arranged substantially as shown and for the purposes described.

STEPHEN KALTONIK.

Witnesses:
R. C. WINSLOW,
GEO. W. MURRAY.